W. W. HEWITT.
CASK MAKING MACHINERY.
APPLICATION FILED FEB. 15, 1910.

1,083,445.

Patented Jan. 6, 1914.

Witnesses

Inventor
W. W. Hewitt
by his Attorneys

W. W. HEWITT.
CASK MAKING MACHINERY.
APPLICATION FILED FEB. 15, 1910.

1,083,445.

Patented Jan. 6, 1914.

Witnesses

Inventor
W. W. Hewitt
by his Attorneys

W. W. HEWITT.
CASK MAKING MACHINERY.
APPLICATION FILED FEB. 15, 1910.

1,083,445.

Patented Jan. 6, 1914.
13 SHEETS—SHEET 8.

UNITED STATES PATENT OFFICE.

WILLIAM WALTER HEWITT, OF GREENHITHE, ENGLAND.

CASK-MAKING MACHINERY.

1,083,445. Specification of Letters Patent. Patented Jan. 6, 1914.

Application filed February 15, 1910. Serial No. 544,010.

*To all whom it may concern:*

Be it known that I, WILLIAM WALTER HEWITT, cement manufacturer, a subject of the King of Great Britain, residing at Knockhall Lodge, Greenhithe, in the county of Kent, England, have invented new and useful Cask-Making Machinery, of which the following is a specification.

This invention relates to the manufacture of casks, drums, packing cases and the like from sheets formed of staves or slats riveted to bands. For this purpose the staves or slats are fed to mechanism which in the case of casks or the like forces them into close contact with each other or in the case of light packing cases spaces them at the proper distances apart. Parallel bands punched with the necessary holes are laid upon them and they are then drilled and carried on to rivet feeders which insert rivets into the holes in the bands and staves or slats. The sheet so formed is fed between riveting tools which clench the ends of the rivets. In the case of bulged casks the staves are forced between guides which bend the staves to the necessary extent before they come to the tools.

The accompanying drawings show a machine made in accordance with my invention.

1 are guides in which sufficient staves to make a cask are piled one on the other so that the lowermost lies in front of a pusher or series of pushers 2 which is reciprocated on a fixed guide or series of guides 3 by links 4 from arms 5 on a shaft 6 which is rocked backward and forward as follows:—

Figure 1:
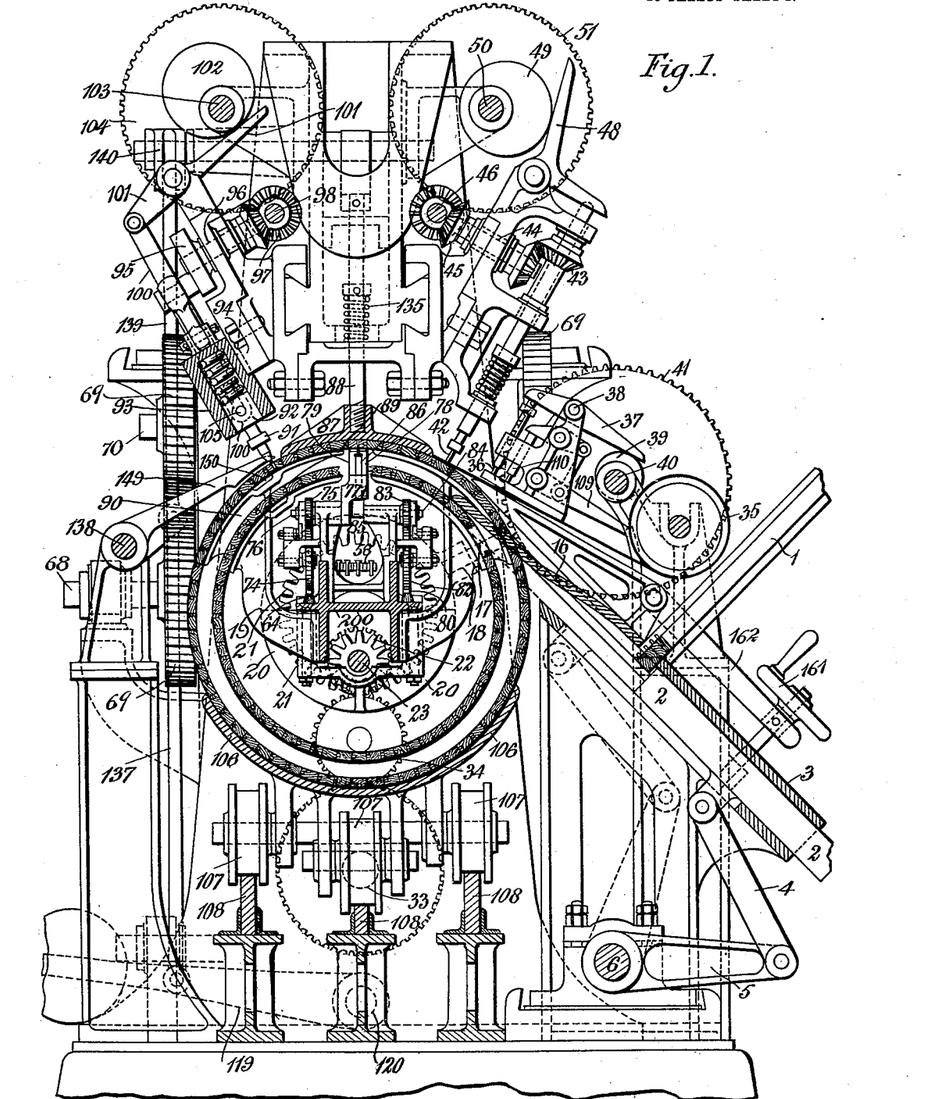
Figure 1 is a transverse vertical section representing two sections of the staves and of the guide 16 in parallel planes.
Figure 5:
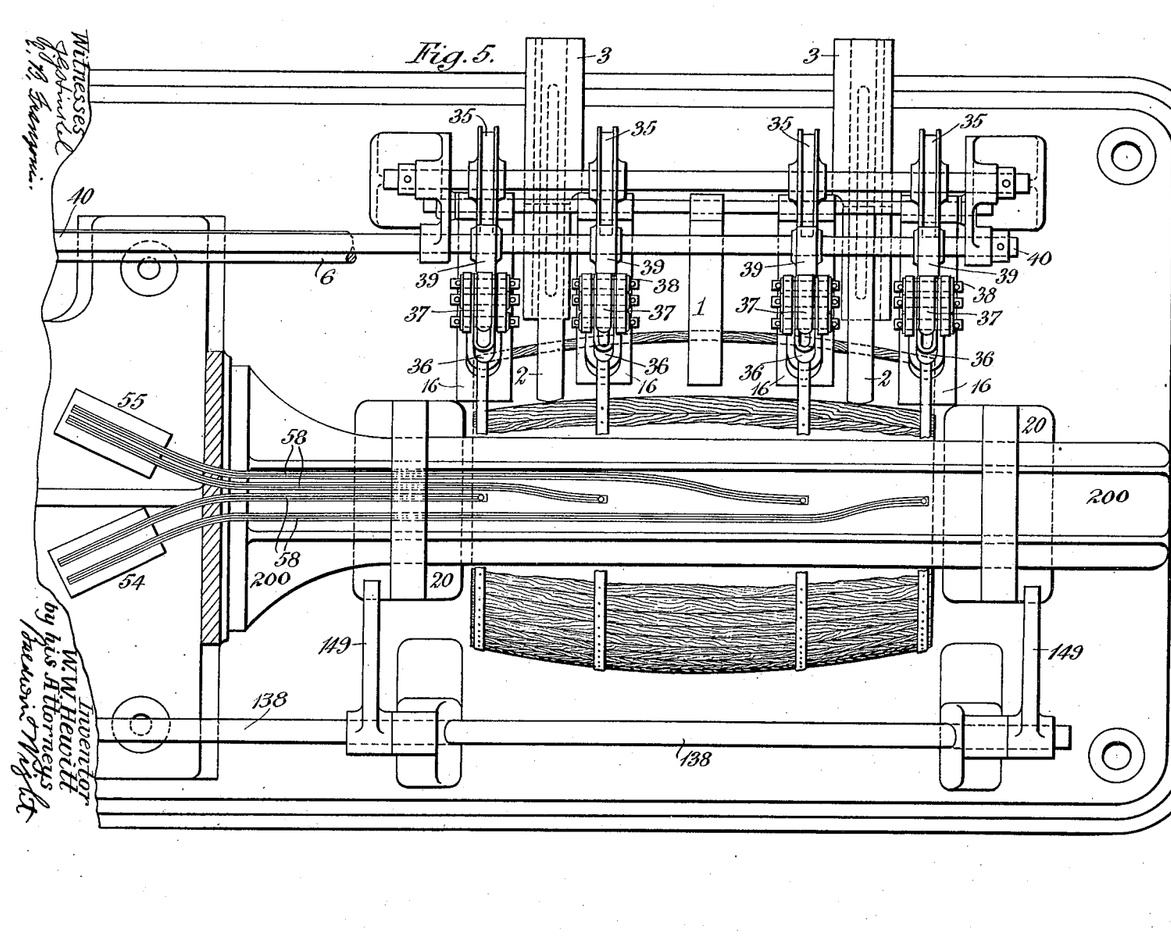

7 is the main shaft constantly rotated in any convenient way and driving through spur gear 8 a shaft 9 on which is a disk 10 carrying a crank pin 11 linked (see Fig. 2) by links 12, 13 to a bell crank 14 linked to an arm 15 on the shaft 6. The pusher therefore forces the staves beneath suitable guides 16 (see Fig. 5) and into close contact with one another, the first stave coming up against a dummy stave 17 carried on two spring arms 18 projecting radially from two rings 19 which are turned in bearings 20 carried by a frame 200 by internal rings of teeth 21 gearing with spur wheels 22 on a shaft 23 to which a step by step movement is given as follows:—A vertical rack 24 (see Fig. 3) which is reciprocated by a link 25 from a crank disk 26 on a shaft 27 geared with the main shaft by a gear wheel 28 drives a pinion 29 which by clutch mechanism 291 turns a shaft 30 each time the rack 24 descends, and a worm 31 on this shaft gearing with a worm wheel 32 drives a shaft 33 geared by an idler wheel 34 to the shaft 23. A step by step movement of rotation is thereby imparted to the dummy stave 17 in an anticlockwise direction as seen in Fig. 1.

Figures 13, 14, 15:
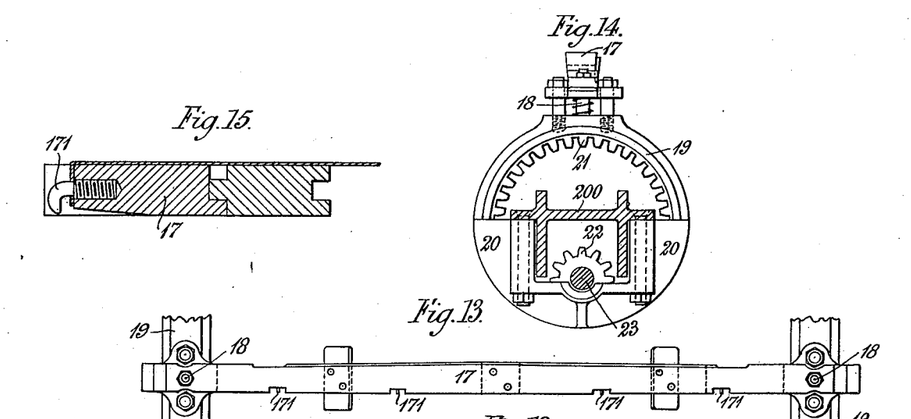

Before a cask is started the requisite number (four in the machine illustrated) of metal bands are led from coils or bundles 35 beneath punches 36 and secured to hooks 171 on the dummy stave see Figs 13 to 15. The punches may be actuated by levers 37 rocked about pivots 38 by cams 39 on a longitudinal shaft 40 constantly rotated by spur gear 41 from the shaft 9. As therefore the dummy stave 17 advances it draws the bands past the punches 36 and lays them on the staves which presently come beneath drills 42 which passing through the holes in the bands drill holes in the staves. The drills are rotated by bevel gears 43, spindles 44, and bevel gear 45 from a continuously rotating longitudinal shaft 46 driven by spur gear 47 from the main shaft and are depressed at the proper times by cranked levers 48 rocked by cams 49 on a longitudinal shaft 50 rotated by a toothed wheel 51 from an idler wheel 52 gearing with a wheel 53 on the main shaft. Rivets are next inserted in the holes in the staves. If the staves are thicker in the middle than at their ends, it is necessary to employ two different lengths of rivets, the longer ones serving for the middle bands and the shorter for the end bands, but as the mechanism for feeding and clenching the rivets is the same for all, I will only describe one set.

Figure 3:
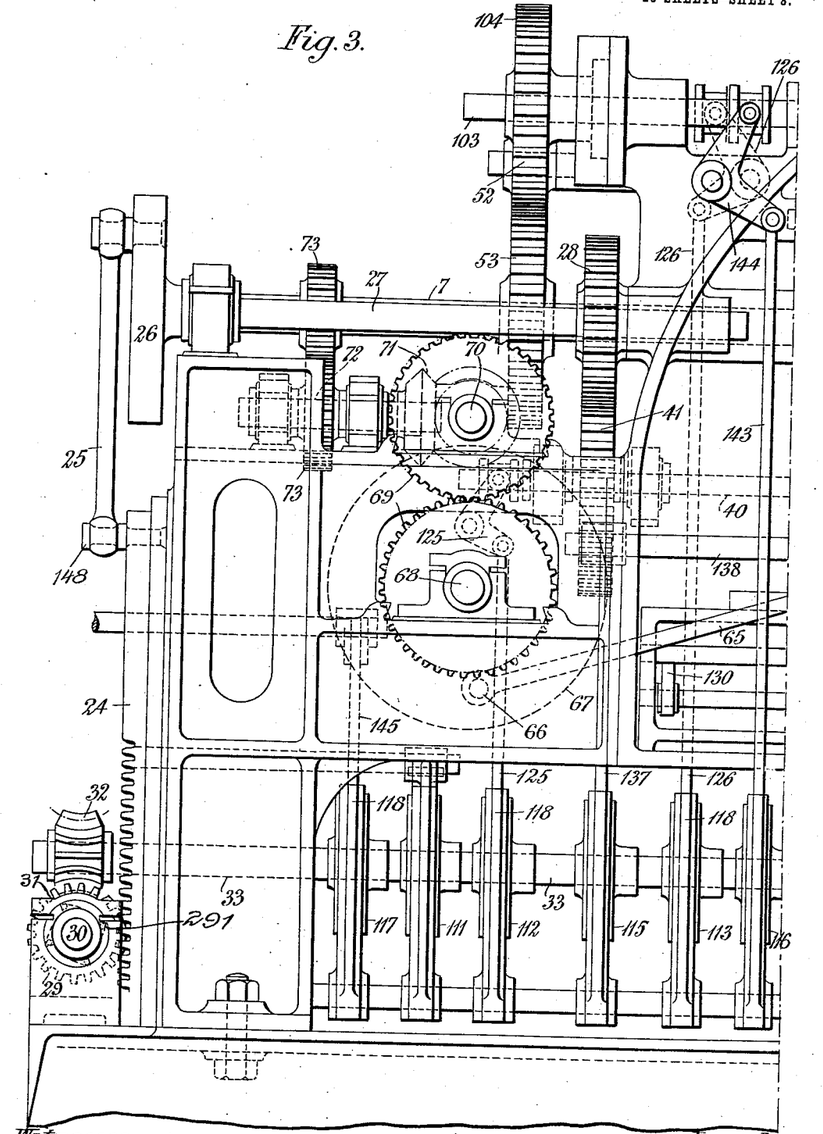
Fig. 3 is a side view partly in section.
Figures 3, 6:
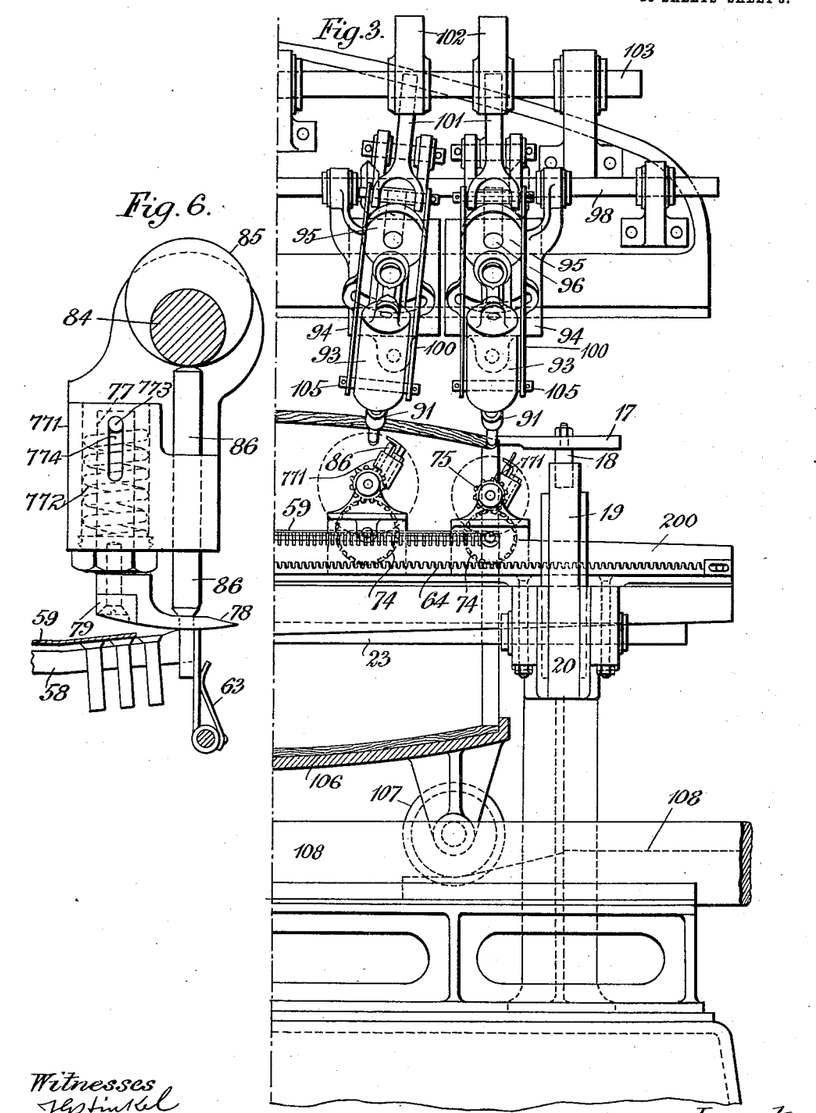
Fig. 6 shows a detail.
Figures 9, 11:
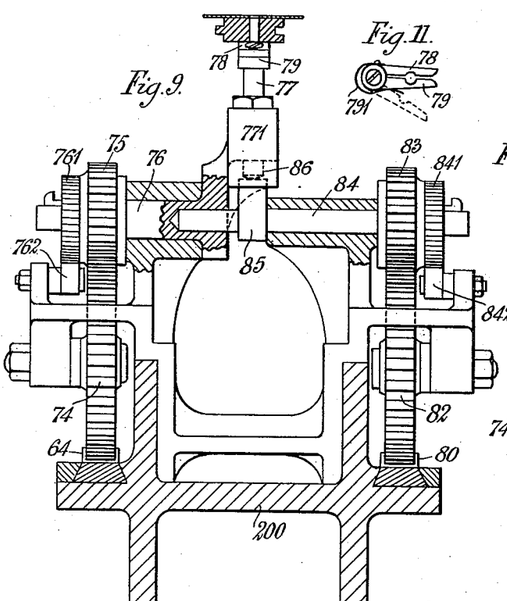
Figs. 9, 10 and 11 show details of the devices for picking up the rivets.
Figure 10:
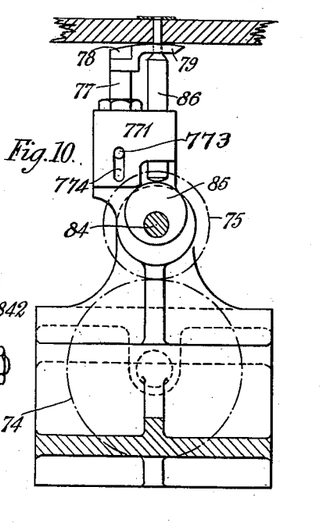
Figure 12:
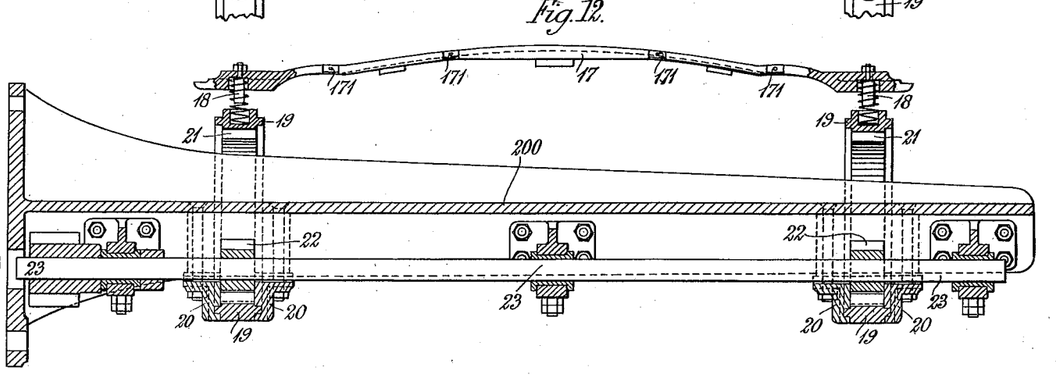
Figs. 12 to 15 show details of the dummy stave to be hereinafter described.

54 is a hopper containing short rivets and 55 a hopper containing longer rivets. These hoppers are shaken by agitators 56 on a spindle 57 driven by a belt from any one of the longitudinal shafts that is convenient so that the rivets in them may enter the channels 58 seen in detail in Fig. 5. The rivets in a channel pass beneath a plate 59 which keeps them from jumping up and are urged onward by rotating spring fingers 60 on a spindle 61 driven by a band 62 from the spindle 57. Just before the end of the channel the plate 59 ends and the channel then curves slightly upward so that the head of the first rivet is raised slightly above that of the second. The first rivet is kept from falling out of the channel by a fairly stiff spring 63 see Fig. 6 which shows this detail to an enlarged scale. The rivets are picked up, inverted and inserted into the staves as follows:—A long rack 64 is reciprocated by a link 65 from a crank pin 66 on a disk 67 on a cross shaft 68 driven by gear wheels 69 from another cross shaft 70 driven by miter wheels 71 from a short axle 72 geared to the main shaft by wheels 73. The rack 64 gears with a pinion 74 which drives a free wheel 75 which intermittently turns a spindle 76 on which is a spring box 771 in which can slide a rod 77 impelled by a spring 772 toward the shaft 84 (see Fig. 6), the movements of the rod being limited by a pin 773 upon its moving in a slot 774 in the wall of the box. The rod 77 carries a pair of jaws, see Figs. 9, 10 and 11, one of which 78 is fixed while the other 79 is hinged, a spring 791 tending to hold the jaws closed. Each time that these jaws pass the lowest point of their path they pick up a rivet by the head and carry it around with them. A second long rack 80, reciprocated by a link from a crank disk 81 on the cross shaft 68, gears with a pinion 82 which drives a free wheel 83 that intermittently turns a spindle 84 on which is a cam 85 reciprocating a plunger 86. As the spring box 771, with its rod 77, rises this plunger is pushed out by the cam and, coming up against the head of the rivet in the jaws, prevents it from falling until it comes beneath the hole in the stave when the plunger moves still further and pushes the rivet into the stave, the rod 77 being moved upward against the spring 772 by the plunger. The spindles 76 and 84 have upon them ratchet wheels 761 and 841 engaged by pawls 762 and 842 which prevent backward motion. These parts are all carried by a frame 200 which passes along the axis of the cask. A presser plate (or series of plates) 87 carried by plunger rods 88 rests upon the staves at this point and prevents their being pushed upward. As the stave into which the rivets have just been inserted moves on the hinged jaws 79 yield and allow the rivets to pass and the heads of the rivets then ride up a fixed incline 89 on an anvil 90 and the rivets are thus pushed home just as they come beneath riveters 91.

Each riveter is carried by a block 92 in a spring box 93 reciprocated in a guide 94 by a crank disk 95 on an axle 96 continuously rotated by miter gear 97 from a longitudinal shaft 98 continuously rotated by spur gear 99 from the main shaft. Two slotted links 100 from a lever 101 rocked by a cam 102 on a longitudinal shaft 103 rotated by a toothed wheel 104 gearing with the idler wheel 52 embrace a pin 105 which passes through the block 92. The spring box, spring and block are all reciprocated together and when the tool is acting on a rivet the spring is not compressed but when the cam 102 rocks the lever 101, the links 100 raise the block 92 compressing the spring and the tool therefore is lifted so that it does not hit the staves. As the partly formed cask proceeds it comes onto a carriage 106 supported by wheels 107 running on rails 108. When the last stave has been riveted an attendant severs the bands by lifting lever handles 109 which actuate cutting tools 110 see Fig. 1. The bands are then disconnected from the dummy stave which is then pressed inward the springs in the arms 18 allowing of this whereupon the cask closes up of its own accord. The carriage 106 is then moved along its rails to withdraw the cask from the machine, the rails being suitably inclined to give such lift and tilt to the cask as may be required to enable it to clear the various parts of the mechanism. The guides 16 are meanwhile moved out of the way by means of the hand wheel 161 and lever 162.

Figure 2:
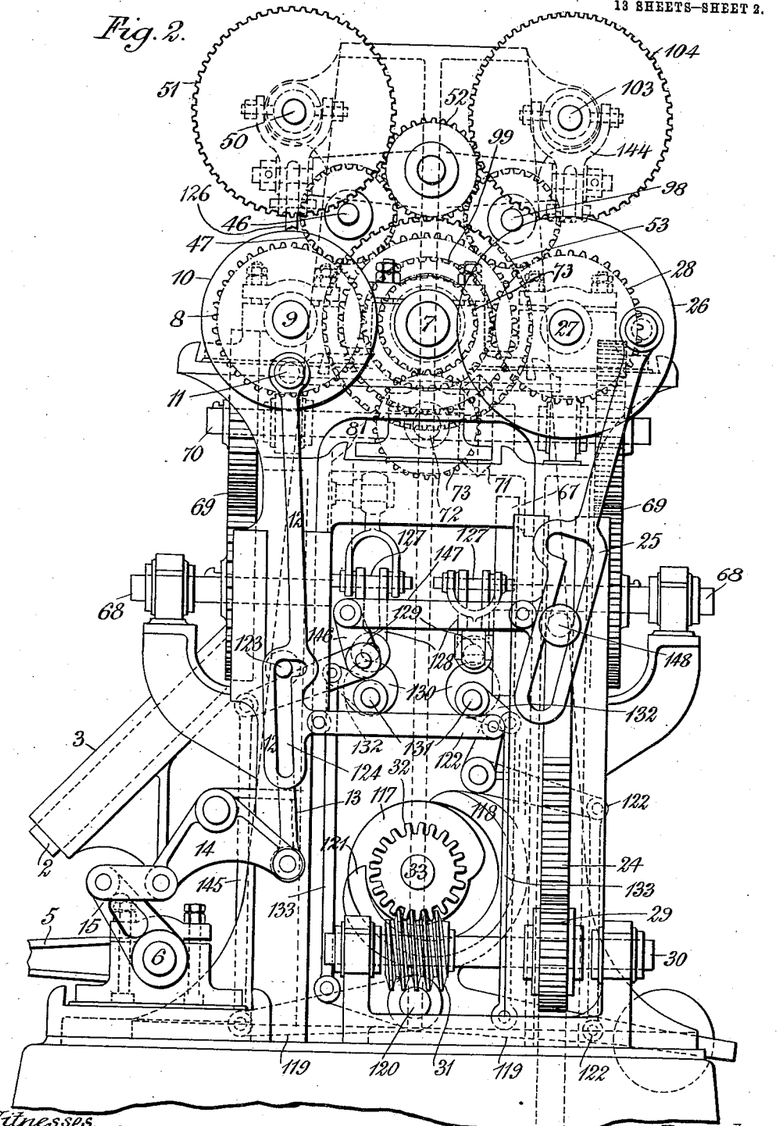
Fig. 2 is an end elevation.
Figure 4:
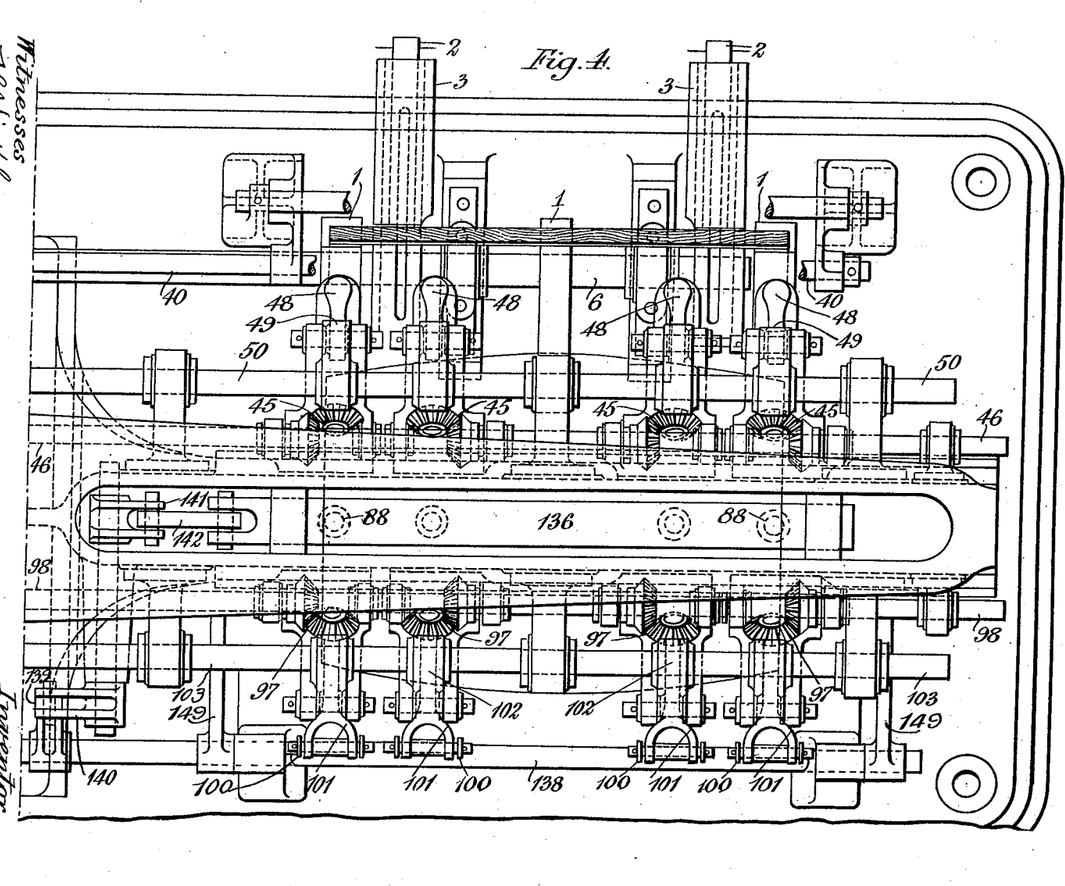
Fig. 4 is a plan, and Fig. 5 a sectional plan.
Figure 7:
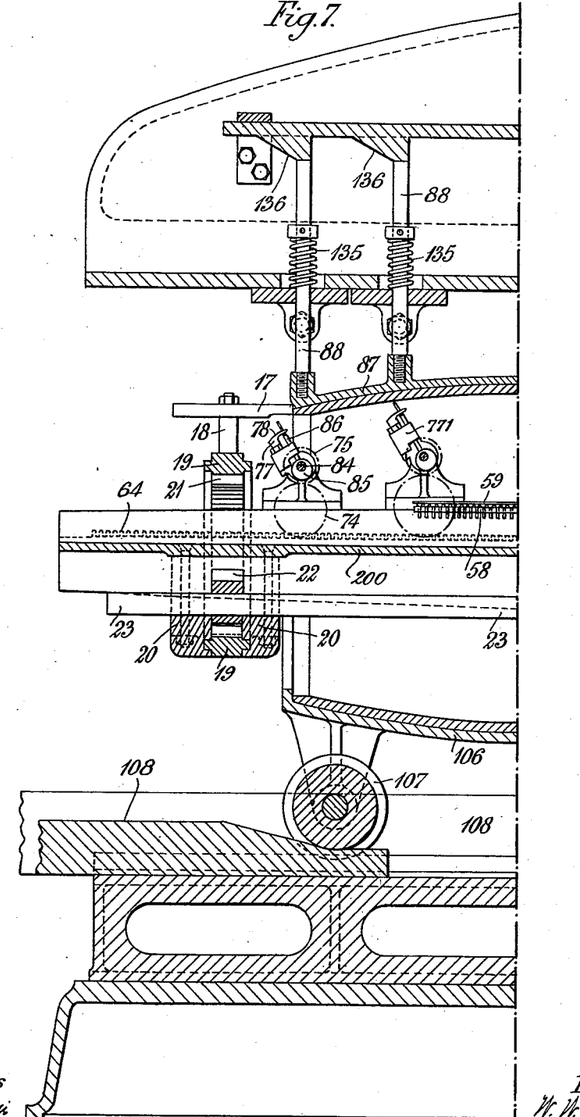
Fig. 7 is a longitudinal vertical section looking in the opposite direction to Fig. 3.
Figure 8:
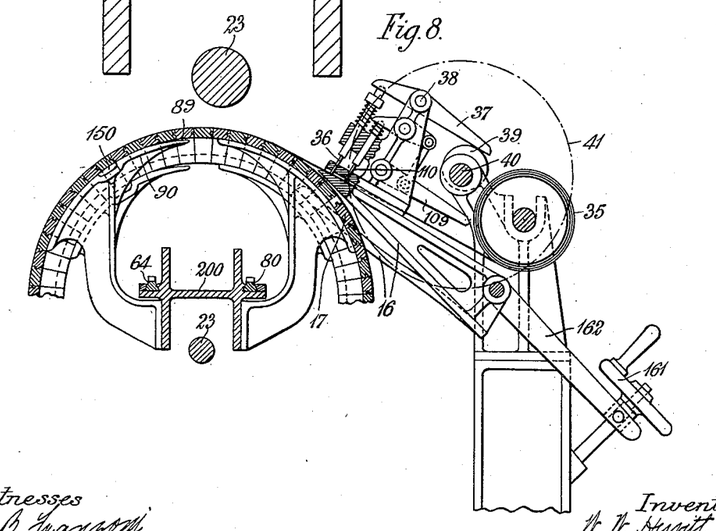
Fig. 8 is a cross section of part of the mechanism.

In order that the various appliances may be thrown out of work at the proper time I provide the following mechanism: On the shaft 33 are seven similar cams numbered 111 to 117 the last of which is seen in Fig. 2. Each cam is engaged by a strap 118 connected to a weighted arm 119 turning loosely on a long pivot 120 common to all the arms. In the position shown in Fig. 2 the arm has fallen owing to its weight and stopped the mechanism since the raised portion of the cam has passed from beneath the end 121 of the strap. The cam 111 controls the stave feed-links and a bell crank 122 connects its arm 119 with the link 12 which as the arm 119 falls is pulled to the right (see Fig. 2) and the pin 123 on the link 13 which formerly was in the horizontal part of the slot 124 of the link 12 is now in the vertical part thereof and the link 13 therefore comes to rest and the stave pusher is no longer operated. Cam 112 controls the punches—a link and bell crank 125 cause the shaft 40 to move longitudinally in its bearings and the cams 39 are thus moved out of engagement with the levers 37. Cam 113 controls the drills—a link and bell crank 126 cause the shaft 50 to move longitudinally and the cams 49 are thus moved out of engagement with the levers 48. Cam 114 controls the rivet feed as follows:—The ends of the links which connect the racks 64 and 80 with the crank disks 67 and 81 are not fast with the racks but are pivoted to cross pins 127. These pins are carried by brackets 128 sliding on a frame 129 which can be raised and lowered slightly by cams 130 on spindles 131 connected by arms 132 and links 133 to the weighted arm of the cam 114. In the position shown in Fig. 3, the frame 129 is up and the pins 127 are reciprocating without engaging the racks but when the frame is down the pins fall into notches 134 cut in the racks which are therefore operated. Cam 115 controls the presser plate or plates 87. These are carried by plunger rods 88 urged upward by springs 135 (see Fig. 1 and Fig. 7) but pushed down against the springs at the proper time by inclines 136 seen in plan in Fig. 4. The arm of cam 115 is connected by a link 137 to a rocking spindle 138 which conveys the motion to a link 139 which by means of the bell cranks 140, 141 and link 142 moves the inclines to the left (as seen in Fig. 7) to depress the presser plates and to the right (as seen in that figure) to allow the springs 135 to raise them out of action. Cam 116 controls the riveters—a link 143 and bell crank 144 moving the shaft 103 longitudinally so as to bring the cams 102 out of engagement with the levers 101. Lastly cam 117 stops the rotation of the cask as its link 145, bell crank 146 and link 147 move the link 25 so that it plays idly on the pin 148 of the rack 24 and the shaft 33 is therefore no longer driven. Cam 115 also may be used to push the dummy stave inward as follows:—The rocking spindle 138 rocked by link 137 from the weighted arm of cam 115, carries two arms 149 which descend upon the ends of the dummy stave and force it inward into recesses 150 formed in the anvils 90. By shifting the idler wheel 34 (seen in the middle of Fig. 3 and Fig. 7) out of engagement with the pinions meshing with it, the dummy stave may be readily turned back to its initial position ready for beginning another cask without interfering with any of the rest of the gear, the shaft 33 with its cams being meanwhile locked by the worm 31.

In place of feeding the staves one by one to the machine I may form them into a cask in a trussing machine in the usual way and then place the cask on the carriage and insert it into the machine, connect one of the staves to the arms 18 and start the machine which will then bore and rivet the staves.

If the staves or slats are thin, the drilling or punching and riveting tools may be omitted, the rivets being forced through them and clenched at one operation by the rivet feeding mechanism, and thick staves or slats may be bored and prepared before being fed into the machine.

What I claim is:—

1. In a cask-making machine, the combination of a dummy stave, means for moving it step by step around an axis parallel to its length, bands secured to the dummy stave, means for pushing a series of staves against the dummy stave, and means for securing the bands to the staves.

2. In a cask-making machine, the combination of a dummy stave, means for moving it step by step around an axis parallel to its length, bands secured to the dummy stave, means for pushing a series of staves against the dummy stave, an axial frame, means carried by the frame for inserting rivets into holes in the staves and bands, and means for clenching the ends of the rivets.

3. In a cask-making machine, the combination of a dummy stave, means for moving it step by step around an axis parallel to its length, bands secured to the dummy stave, means for punching holes in the bands, means for pushing a series of staves against the dummy stave, an axial frame, means carried by the frame for inserting rivets into holes in the staves and bands, and means for clenching the ends of the rivets.

4. In a cask-making machine, the combination of a dummy stave, means for moving it step by step around an axis parallel to its length, bands secured to the dummy stave, means for pushing a series of staves against the dummy stave, means for drilling holes in the staves, an axial frame, means carried by the frame for inserting rivets into holes in the staves and bands, and means for clenching the ends of the rivets.

5. In a cask-making machine, the combination of a dummy stave, means for moving it step by step around an axis parallel to its length, bands secured to the dummy stave, means for punching holes in the bands, means for pushing a series of staves against the dummy stave, means for drilling holes in the staves, an axial frame, means carried by the frame for inserting rivets into the holes in the staves and bands, and means for clenching the ends of the rivets.

6. In a cask-making machine, the combination of a dummy stave, means for moving it step by step around an axis parallel to its length, bands secured to the dummy stave, means for punching holes in the bands, means for pushing a series of staves against the dummy stave, an axial frame, means carried by the frame for inserting rivets into holes in the staves and bands, means for clenching the ends of the rivets, and means for cutting the bands.

7. In a cask-making machine, the combination of a dummy stave, means for moving it step by step around an axis parallel to its length, bands secured to the dummy stave, means for pushing a series of staves against the dummy stave, means for securing the bands to the staves, and means for removing the dummy stave on completion of the series of staves.

8. In a cask-making machine, the combination of a pair of radial arms, means for moving them step by step around an axis, a dummy stave carried by the arms, bands secured to the dummy stave, means for pushing series of staves against the dummy stave, and means for securing the bands to the staves.

WILLIAM WALTER HEWITT.

Witnesses:
RIPLEY WILSON,
H. D. JAMESON.